Sept. 27, 1966    J. E. BARTLETT    3,275,287
COMPONENTS FOR FAUCET VALVE WASHER REPLACEMENT
Filed April 11, 1963
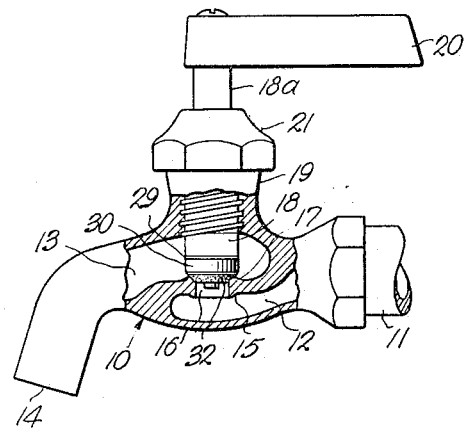
Fig. 1.
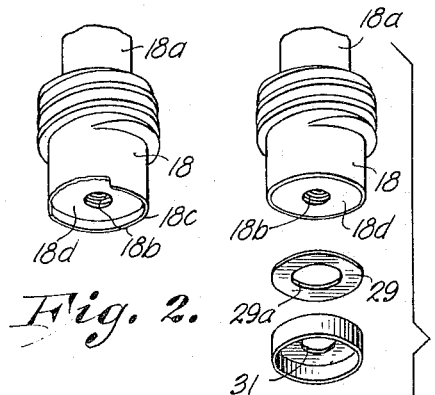
Fig. 2.
Fig. 3.
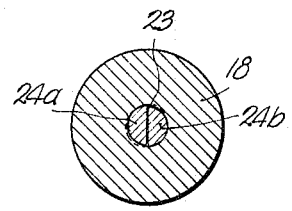
Fig. 5.
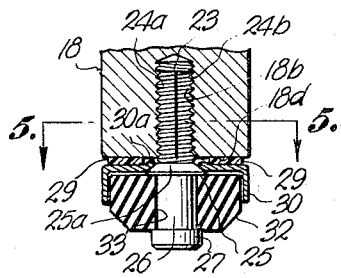
Fig. 4.
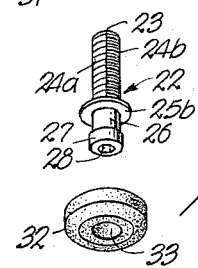
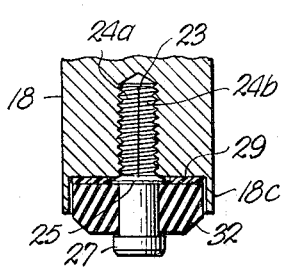
Fig. 7.
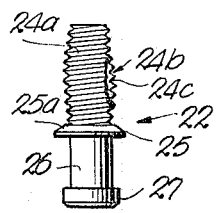
Fig. 6.
INVENTOR.
Joseph E. Bartlett
BY
Scofield, Kokjer, Scofield & Lowe
ATTORNEYS.

United States Patent Office 3,275,287
Patented Sept. 27, 1966

3,275,287
COMPONENTS FOR FAUCET VALVE WASHER
REPLACEMENT
Joseph E. Bartlett, 215 S. Parker Ave., Highway 7,
Olathe, Kans.
Filed Apr. 11, 1963, Ser. No. 272,345
2 Claims. (Cl. 251—88)

This invention relates generally to fastener means, particularly of the self-locking type and refers more particularly to a novel fastener construction which, while it is capable of other uses, is particularly advantageous in its application to and incorporation in a combination for repairing worn faucet stems and washers.

When faucets become leaky, most often it is due to a faulty washer. The washer may have become worn to the point of no longer providing a satisfactory seal, or have deteriorated into a hard nonresilient state with the same result, or both. The destruction of the washer from wear occurs by far the most in those valve assemblies where the washer is rigidly affixed to the stem and thus is subjected to rather severe frictional abrasion during opening and closing of the valve. This abrasion is due to rotary contact of the washer with the valve seat. Valves of this type are in the great majority in present plumbing installations.

In repairing faulty valves of this type, two approaches have been generally adopted. One is to replace the entire stem with a new replacement stem assembly in which the washer is rotatably connected with the stem. This, however, is a rather expensive procedure and often results in substantial waste since the original stem may be in good shape and entirely satisfactory for use except as to the way in which the washer is attached to it. The other approach is simply to remove the old washer and its holding screw and to replace either the washer alone or both the screw and washer. A good example of a device intended to accomplish the latter is seen in the patent to Bowlzer, No. 2,717,757 issued September 13, 1955. The patented device is a snap-in unit embodying a split pin, a cup and a special disc type washer. The unit is designed to fit different sized stems, the split legs of the pin being sufficiently spread that when the pin is inserted, they are squeezed together and a measure of frictional engagement is gained between the legs and the threaded recess in the stem. Units of this type have met with rather extensive success and while they do represent an improvement over replacement of the complete stem assembly in some instances, nevertheless there are still some drawbacks, these residing largely in the inability to obtain a completely secure fastening of the pin to the stem, wobbling of the washer assembly and/or lack of rotational freedom of the washer when it is brought into contact with the seat.

The present invention has for one of its principal objects the provision of a greatly improved fastener means which can be produced in one selected size and which is particularly suited to obtaining secure connection of replacement washers with valve stems having differing diameter screw recesses, although the portion of the pin which is received in the recess and relied upon for the securing mechanism lends itself as well to other applications wherein a self-locking element usable in different sized apertures is needed. The means of my invention has considerable advantage over those of the prior art of which I am aware, principally in the secure connection which is achieved with the stem and in the manner in which the washer is supported therefrom.

A further and equally important object of the invention is to provide a simple washer replacement assembly which can be used to obtain a rotatable mounting of the washer on the stem thus assuring that the replacement washer will have a considerably longer operating life than the original equipment. It is a special feature of the invention that stems having integral cups can easily be returned to good operating condition even though the lip of the cup may be severely damaged and even broken entirely away.

A further object of the invention is to provide a means for supporting a washer on a valve stem which is capable of mounting thereto the conventional bibb washer in use today. A very important feature of my invention is the avoidance of a specially designed washer, and the ability, once the replacement washer has worn out, of replacing same simply with a new washer readily available from a hardware or other supply store.

Still another object of the invention is to provide a washer replacement assembly combinable with the original valve stem without the need of first removing the original valve stem washer retaining cup and with a minimum of effort and which can be produced at relatively low cost.

Other and further objects of the invention together with the features of novelty appurtenant thereto will appear in the course of the following description.

In the accompanying drawing which forms a part of the specification and is to be read in conjunction therewith, and in which like reference numerals indicate like parts in the various views;

FIG. 1 is a side elevational view of a typical water faucet, the body of the faucet being broken away to expose a valve stem fitted with a replacement assembly according to one form of the instant invention;

FIG. 2 is an enlarged fragmentary perspective view showing the lower end of a typical valve stem, the original washer and screw having been removed and showing the damaged rim of the cup which forms a part of the original stem;

FIG. 3 is a view of a stem prepared for reception of the replacement assembly according to the instant invention, the components of the replacement assembly being shown in exploded relation with the stem;

FIG. 4 is a greatly enlarged fragmentary cross-sectional view through the lower end of a stem showing the components of FIG. 3 in operative and completed assembly with the stem;

FIG. 5 is a cross-sectional view taken along the line 5—5 of FIG. 4 in the direction of the arrows;

FIG. 6 is an enlarged side view of the fastener pin component embodying the features of the invention; and FIG. 7 is a view similar to FIG. 4 but illustrating an alternative arrangement of certain components of the replacement assembly.

Referring now to the drawing, FIG. 1 illustrates a typical faucet having the faucet body 10. The faucet is connected with the water line 11. The interior of the faucet body has the flow passageway 12 leading from line 11 and the outlet passageway 13 which connects with the spout 14. Passageways 12 and 13 are separated by the usual partition 15 having the valve opening 16. The upper surface of partition 15 is provided around the margin of the opening 16 with the valve seat 17 as is customary. A valve stem 18 is threadedly received in the nipple 19 on top of faucet body 10. The stem 18 terminates in the upper portion 18a, having the handle 20 secured thereto. A cap nut 21, the interior of which cooperates with suitable packings and the like (not shown) completes the general faucet assembly.

Referring now to FIG. 2, there is shown in this figure the lower end of a typical damaged stem, the original washer and its retention screw (both not shown) having been removed. The washer is normally held to the stem by threading the screw into the threaded recess 18b located centrally of and extending axially into the body of the stem. The usual stem has an axial rim flange 18c which surrounds and projects beyond the face 18d of the stem. The stem 18 is shown as having been damaged by breakaway of material from the rim 18c.

To prepare such a stem for replacement of the washer, the remaining portion of the rim 18c is first broken away and filed smooth so as to present a flat end face completely absent of any projections as illustrated in FIG. 3. This can be done with any convenient tools such as, as already suggested, a hand file and pair of pliers.

The replacement assembly shown in FIG. 3 has as its most inmportant and primary component the fastener pin 22, a detailed side elevation of which is shown in FIG. 6. This pin is manufactured of good quality non-corrosive stainless steel and is provided with a threaded shank portion having a diametric slit or slot 23 cut therethrough so as to divide the shank into opposed legs 24a and 24b. Each leg is substantially semicircular in cross-section, the arcuate surface being threaded. A convenient way of making the pin is to start with a solid threaded shank and to saw or otherwise cut on a milling machine a central diametrically extending slot through the pin up to substantially the length of the shank or threaded portion in order to provide the slot 23.

Referring now to FIG. 6, it is important to note that the legs 24a, 24b are not straight but instead are oppositely bowed in directions substantially parallel with the plane of the slot 23. In other words, again viewing FIG. 6, the leg 24a is bowed to the left while the leg 24b is bowed to the right. As a result, each leg has at its most bowed portion a relatively sharp exposed edge like that shown at 24c. This sharp edge should be so located that it trails the threads as the unit is screwed into the recess 18b of the stem.

The original diameter of the shank of element 22 is made somewhat smaller than the smallest diameter recess which it is expected will be encountered in the use of the pin for washer replacement operations. On the other hand, the dimension across the extremes of the central bowed sections of the shank should be somewhat greater than the largest diameter recess expected to be encountered. Any pin, of course, can and should be designed to work with a limited range of recess sizes.

Continuing with the description of pin element 22, intermediate the pin and adjacent the terminus of the shank is located a circumferential flange 25 which is provided with a frusto-conical surface 25a on the shank side of the flange. The opposite side of the flange 25 is flat as shown at 25b. Proceeding onwardly from the flange 25 is a cylindrical surface 26 which terminates at its outer end adjacent a larger diameter flange 27. The section 26 is made substantially equal in length with the thickness of the washer with which it is to be used and the diameter of section 26 is substantially the same or preferably slightly greater than that of the opening in the washer.

Extending axially into the pin element 22 from that end opposite the shank is a polygonal socket 28 which may be of the Allen type and adapted to receive an Allen wrench.

Returning now to FIG. 3 and continuing with a description of the components of the over-all washer replacement assembly as illustrated in this figure, there is provided an annular gasket 29 with a very low coefficient of friction, a smooth surface nylon being very suitable. This gasket, as shown in FIG. 4, is adapted to lie adjacent the face 18d of the stem. Its opening 29a is preferably of substantially the same diameter as the over-all diametrical measurement across flange 25.

Located next to the gasket 29 is the cup member 30 having the central aperture 31. Preferably, this aperture is only slightly greater than that of the shank of the pin and, as perhaps best seen in FIG. 4, the rim of the aperture of the cup is depressed slightly as at 30a so as to conform with the frusto-conical surface 25a of the pin flange 25.

The remaining component in the assembly is the resilient rubber-like washer 32 which is provided with a central opening 33. The washer may be constructed of natural or synthetic rubber or other elastomeric material and is adapted to be press fitted over the head end of the pin so that it surrounds and fits with the cylindrical surface 26 of the pin and is retained thereon by the flange 27.

In the operation and application of the invention as thus far described, the initial step is, as has previously been mentioned, the preparation of the original stem (if necessary) to receive the replacement assembly. The pin is then prepared for insertion in the recess 18b by sleeving over the shank the cup 30 and the gasket 29. The washer 32 can at the same time be press fitted onto the head. The shank portion of the pin is then started into the recess 18b and is screwed therein by the use of an Allen wrench or other suitable tool as earlier described.

As the shank is screwed into the recess, the bowed sections of the shank are subjected to a squeezing action and are severely stressed. It will be noted that the sharp edges on the bowed sections trail the threads and, therefore, do not interfere in any way with the screwing of the shank into the recess. The shank is screwed in until the cup is firmly, but not too tightly, seated against the gasket 29 and the latter against the face 18d.

The repair is now completed. The stem can be reintroduced into the faucet body in the manner illustrated in FIG. 1.

Due to the manner of formation of the shank and the provision of the bowed sections in the legs thereof, the pin is firmly retained or locked in the stem and perfectly and firmly centered with respect thereto. Counter rotation or screwing out of the pin is resisted by the sharp edges 24c and by the very tight frictional engagement which exists between the thread portions immediately adjacent the sharp edge and the internal threads of the recess due to the pressure applied by the stressing of the legs during insertion of the shank. The resistance is preferably not so great that, if necessary, the shank cannot be removed. However, considerable force and the use of an appropriate tool is required to accomplish this. What is important is that there is no likelihood that the ordinary swirling pressures occasioned by the water moving through the valve or the rotational pressures occurring during seating and unseating of the washer will cause the threaded shank to work its way out of the stem.

Because of the gasket 29, the cup is free to turn on the stem and will do so even though the washer is under seating pressure. Consequently, the washer will remain stationary during seating thereof while the stem continues to turn. The arrangement provides what is almost equivalent to a ball swivel assembly, thereby reducing greatly the abrasion of the washer during repeated seatings and unseatings.

Where the rim 18c formed integral with the stem is not damaged, the replacement cup 30 can be done away with or in other words saved for use on a stem that must have a new cup. This is illustrated in FIG. 7. Here, the rotatable bearing gasket 29 is located between the washer and face of the stem. The gasket 29, being of nylon or other smooth substance, serves to provide a low friction, non-corrosive bearing between the washer and the stem and, consequently, permits easy rotation of the washer on the stem. The fact that the washer is placed under no longitudinal compression assists greatly in facilitating its rotation relative to the stem.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. The combination with a valve stem having an end face provided centrally with a threaded axial recess, of a pin element having a shank portion for threaded insertion in said recess, said shank portion having a slot therein and providing parallel legs, said legs having oppositely deflected central zones deflected in direction substantially parallel to the plane of said slot, said centrol zones having circumferentially directed thread ridges adapted to engage with the threads in said recess, the largest dimension across said central zones being greater than the diameter of said recess and said shank constructed of resilient material, said pin element further provided with a head portion formed as a cylindrical surface and having axially spaced circumferential flanges of greater diameter than said surface at each end, a smooth gasket sleeved over said shank portion of said pin and positioned adjacent said face, and an annular washer sleeved over said head portion and supported on said surface and between said flanges for rotation with respect to said surface.

2. The combination as in claim 1 including a cup member of metallic material centrally apertured and fitted over said shank portion with the cup adjacent the innermost flange, said gasket located between said cup and said face and providing a low friction bearing between said cup and said face.

References Cited by the Examiner

UNITED STATES PATENTS

| | | | |
|---|---|---|---|
| 1,767,287 | 6/1930 | Hosking | 151—14 |
| 2,646,246 | 7/1953 | Tucci | 251—357 |
| 2,713,186 | 7/1955 | Borowsky | 85—9 X |

FOREIGN PATENTS

| | | |
|---|---|---|
| 624,639 | 6/1949 | Great Britain. |
| 653,475 | 5/1951 | Great Britain. |

M. CARY NELSON, *Primary Examiner.*

L. KAMPSCHROR, R. MILLER, *Assistant Examiners.*